United States Patent
Lindsay et al.

(10) Patent No.: US 6,245,204 B1
(45) Date of Patent: Jun. 12, 2001

(54) VIBRATING TIP CONDUCTING PROBE MICROSCOPE

(75) Inventors: Stuart M. Lindsay, Phoenix; Tianwei Jing, Tempe, both of AZ (US)

(73) Assignees: Molecular Imaging Corporation, Phoenix; Arizona Board of Regents, Tempe, both of AZ (US)

( * ) Notice: Subject to any disclaimer, the term of this patent is extended or adjusted under 35 U.S.C. 154(b) by 0 days.

(21) Appl. No.: 09/273,634

(22) Filed: Mar. 23, 1999

(51) Int. Cl.$^7$ .................. G01N 27/27; G01N 27/403; G01B 5/28

(52) U.S. Cl. .............. 204/400; 204/412; 205/790.5; 73/105; 250/306

(58) Field of Search ................ 73/105; 204/400, 204/404, 434, 412; 250/306, 307; 205/790.5

(56) References Cited

U.S. PATENT DOCUMENTS

| | | | |
|---|---|---|---|
| 5,166,520 | * 11/1992 | Prater et al. | ................ 250/306 |
| 5,202,004 | 4/1993 | Kwak et al. | . |
| 5,382,336 | 1/1995 | Bard et al. | . |
| 5,495,109 | * 2/1996 | Lindsay et al. | ................ 250/306 |
| 5,513,518 | 5/1996 | Lindsay | . |
| 5,612,491 | 3/1997 | Lindsay | . |
| 5,753,814 | 5/1998 | Han et al. | . |
| 5,838,005 | 11/1998 | Majumdar et al. | . |

OTHER PUBLICATIONS

MacPherson et al, Combined Scanning Electrochemical–Atomic Force Microscopy, Analytical Chemistry, 72, pp. 276–285, Jan. 2000.*

Jones et al, Simultaneous Topographical and Amperometric Imaging of Surface in Air, Electrochem. Commun. 1, pp. 55–60, Mar. 1999.*

Zhu et al, Scanning Electrochemical Microscopic Observation of a Precursor State to Pitting Corrosion of Stainless Steel, J. Electrochem. Soc., 144, pp. L43–L45, Mar. 1997.*

Proksch et al, Imaging the Internal and External Pore Structure of Membranes in Fluid: TappingMode SICM, Biophy. J., 71, pp. 2155–2157, Jan. 2000.*

MacPherson et al., "In–Situ Imaging of Ionic Crystal Dissolution Using an Integrated Electrochemical/AFM Probe" *J. Am. Chem. Soc.*, vol. 118, No. 27, 1996, pp. 6445–6452 month unavailable.

Bard et al., "Scanning Electrochemical Microscopy" *Electroanalytical Chemistry* vol. 18, (1994) pp. 243–373 month, unavailable.

Fu–Ren F. Fan and Allen J. Bard, "Electrochemical Detection of Single Molecules" vol. 267, Feb. 10, 1995 pp. 871–874.

Han et al., "STM Contrast, Electron–Transfer Chemistry, and Conduction in Molecules" *The Journal of Physical Chemistry*, vol. 101, No. 50, (1997) pp. 10719–10725 Month unknown.

N.J. Tao, "Probing Potential–Tuned Resonant Tunneling through Redox Molecules with Scanning Tunneling Microscopy" *Physical Review Letters*, vol. 76, No. 21, May 1996, pp. 4066–4069.

\* cited by examiner

*Primary Examiner*—Robert J. Warden, Sr.
*Assistant Examiner*—Kaj K. Olsen
(74) *Attorney, Agent, or Firm*—Killworth, Gottman, Hagan & Schaeff LLP

(57) ABSTRACT

A scanning probe microscope is provided for measuring at least one characteristic of a surface, the microscope including a force sensing probe which is responsive to the at least one characteristic of the surface, an oscillator which moves the position of the probe relative to the surface, a voltage source for establishing an electrical potential between the force sensing probe and the surface, and a detector which detects the oscillating component of the electrical current flow into or out of the probe as a measure of the at least one characteristic of the surface. The microscope can be operated to simultaneously acquire both electrical and topographical information from a surface of a substrate.

9 Claims, 7 Drawing Sheets

VIBRATING TIP CONDUCTING PROBE MICROSCOPE

BACKGROUND OF THE INVENTION

This invention relates to scanning probe microscopy, and, more particularly, to an instrument for the simultaneous acquisition of electrical and topographical information about a surface under electrochemical potential control.

This invention was made with government support under Contract No. BIR-9513233 awarded by the National Science Foundation. The government has certain rights in the invention.

Figure 1:
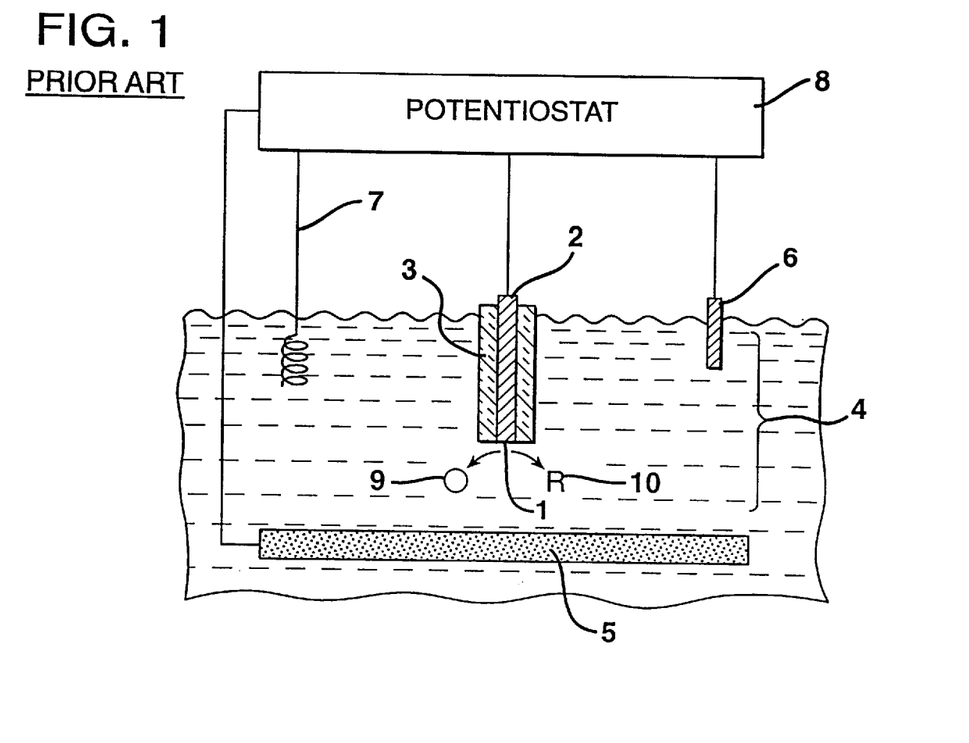
FIG. 1 is a schematic illustration of a scanning electrochemical microscope (SECM) in accordance with the prior art.

The scanning electrochemical microscope (SECM) is a device for measuring the currents owing to electrochemically active species at, or near, a surface, and for mapping their distribution with a spatial resolution on the order of micrometers. FIG. 1 shows the schematic layout of a SECM as taught by Kwak et al, U.S. Pat. No. 5,202,004 and Bard et al, "Scanning Electrochemical Microscopy," *Electroanalytical Chemistry*, vol. 18:243–373 (1993). The microscope includes a small metal electrode 1, made from a wire 2 covered by insulation 3 which is cut away at one end to expose the inner conductor. The electrode is placed in a solvent 4 containing dissolved ions 9, 10. The tip of the electrode is held in place some distance above a sample to be examined 5 which may, or may not be a conductor. The electrode 1, is connected to a potentiostat 8, to which is also connected an auxiliary electrode 7 and a reference electrode 6. Sample 5, if conducting, may also be connected to the potentiostat. The potentiostat is used to control the potential of the electrode 1 and the sample 5 (if conductive) with respect to the reference electrode 6 by means of a potential applied to the auxiliary electrode, as is well known to those skilled in the art.

The dissolved ions 9, 10 can exist in one of several charge states, for example $Fe^{++}$ or $Fe^{+++}$. Referring to the less positively charged state as R and the more positively charged state as O, these ions, together with their associated dissolved anions, form a mediator, so called because they mediate the currents that flow between the electrodes. Suitable salts for forming mediator solutions are described in Bard et al. The two charged species exist in equilibrium at an electrode held at the formal potential, $E_0$ for the process $O \leftrightarrow R$.

If the electrode 1 is held negative of the formal potential, species O become reduced to R, giving rise to a current flow through the electrode 1. As a result, the concentration of species O falls in the vicinity of the electrode 1, so that the current also falls. Eventually, the current falls to an equilibrium value determined by the geometry of the electrode and the speed with which replacement ions O can diffuse to the electrode 1. For a disk electrode of radius a, this limiting current is given by the equation:

$$I_L = 4nFDc \quad (1)$$

where n is the number of electrons transferred at each reduction, F is the Faraday constant ($9.6 \times 10^4$ Coulombs per mole of charge), D is the diffusion constant of the ions (often assumed to be the same for O as R and on the order of $5 \times 10^{-6}$ cm$^2$/s) and c is the concentration (in moles per cm$^3$, if a is in cm and D is in cm$^2$/s). The time for the equilibrium current to be reached is small in the case of a small electrode, being on the order of $a^2/D$, or only a few milliseconds where a is on the order of a micron and $D = 5 \times 10^{-6}$ cm$^2$/s.

Figure 2:
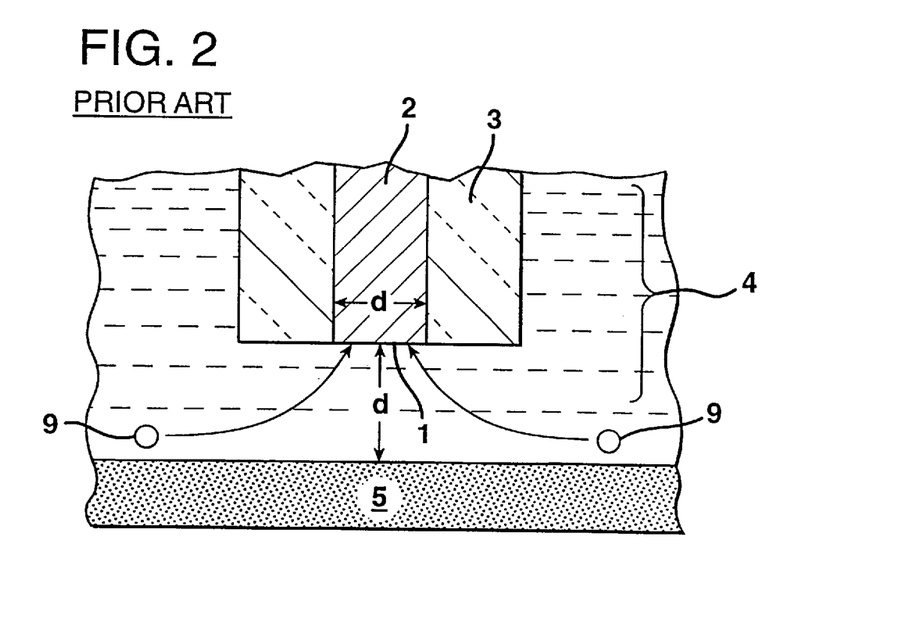
FIG. 2 is a schematic illustration of how an insulating surface restricts the flow of ions to an electrode in accordance with the prior art.

The SECM profiles a surface by utilizing the manner in which the surface affects the diffusion of ions to the electrode. If, for example, the sample surface 5 is an insulator, it blocks the flow of ions to the electrode if the electrode is placed within a distance on the order of its diameter ($d = 2a$) of the surface, as illustrated in FIG. 2. The ion species O, 9, is now constrained to flow in from the sides only, flow from below being blocked by the surface 5. If the electrode tip 1 is now scanned over a surface of varying height, then the flow of current will increase as the surface retreats from the tip, and increase if the surface approaches the tip. This current signal may be used to control the position of the tip and to form a map of the surface, as described by Kwak et al, above.

Figure 3:
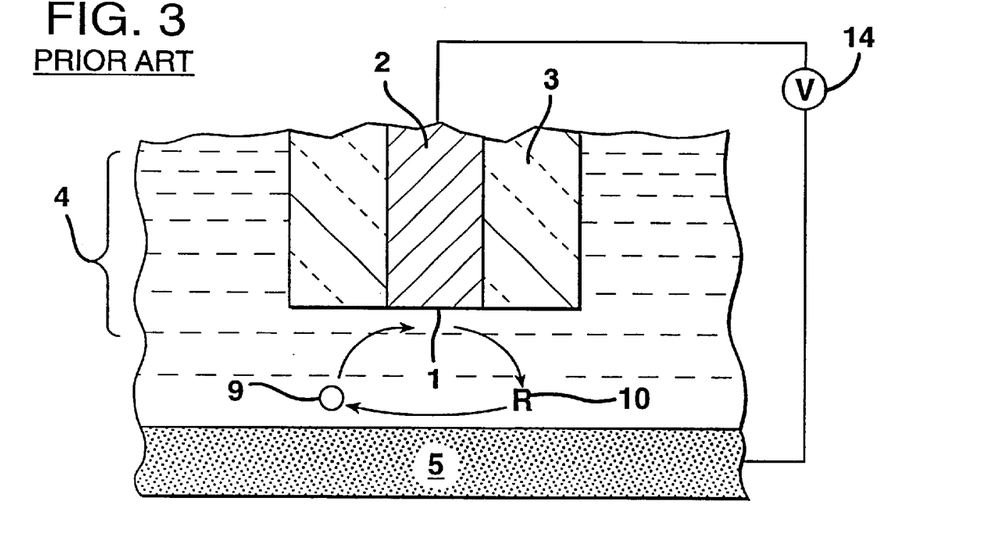
FIG. 3 is a schematic illustration of how a conducting electrode enhances the flow of ions to an electrode in accordance with the prior art.

The SECM may also be used to profile conducting surfaces as illustrated in FIG. 3. In this case, the flow of current is enhanced as the surface of sample 5 is approached. This is because ions that are reduced at the electrode 1 may be rapidly re-oxidized at the sample surface, thereby increasing the supply of ions O in the vicinity of the electrode 1.

This scheme suffers two drawbacks: First, the resolution is limited by the exposed electrode area (being about an electrode diameter, d, under optimal circumstances). Second, it is difficult to profile heterogeneous surfaces which consist of both insulating and conducting portions. This is because a conducting surface which recedes from the probe gives a falling current, just as an insulating surface which approaches the tip.

Figure 4:
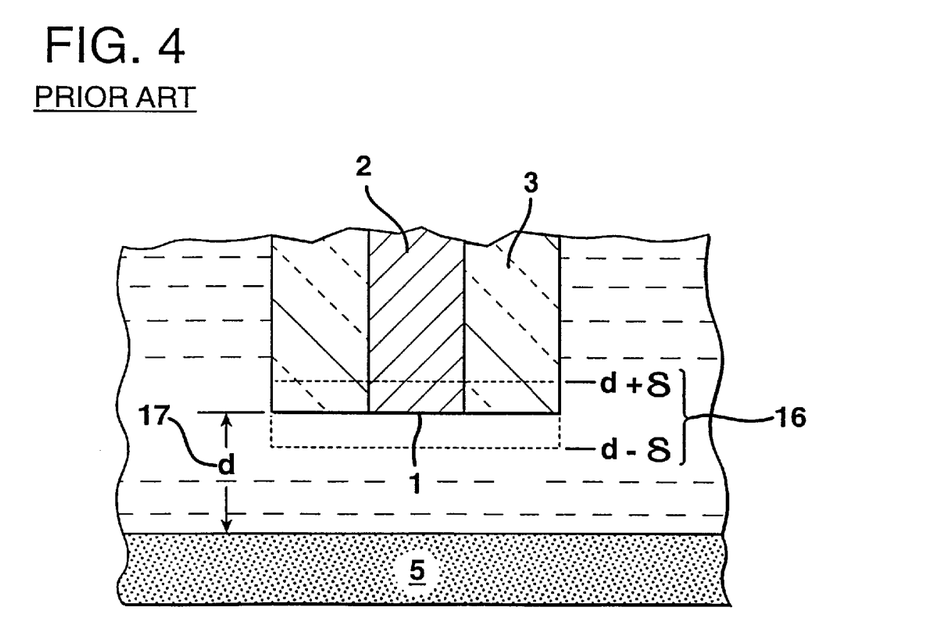
FIG. 4 is a schematic illustration of an oscillating probe scanning electrochemical microscope in accordance with the prior art.
Figure 5:
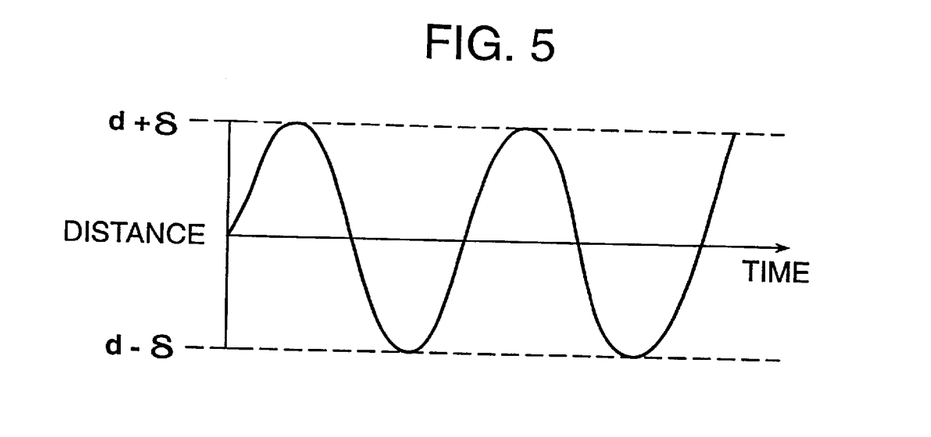
FIG. 5 is a plot of oscillation distance versus time for an oscillated electrode on a conducting surface.
Figure 6:
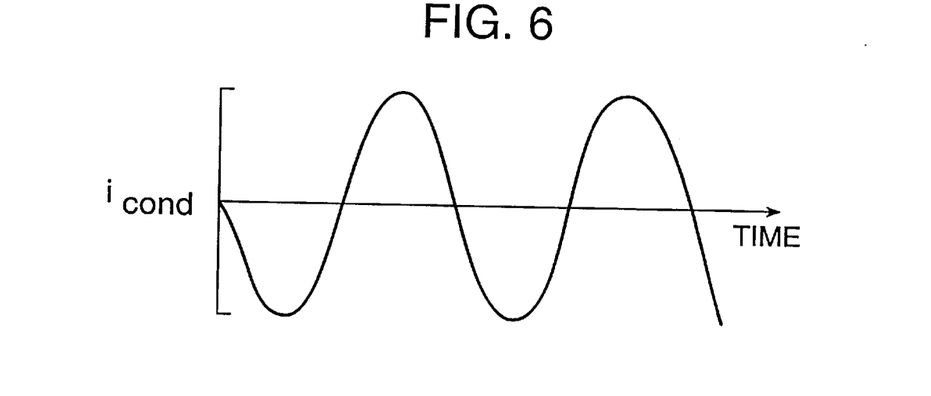
FIG. 6 is a plot of the oscillating component of the current in FIG. 5 versus time.
Figure 7:
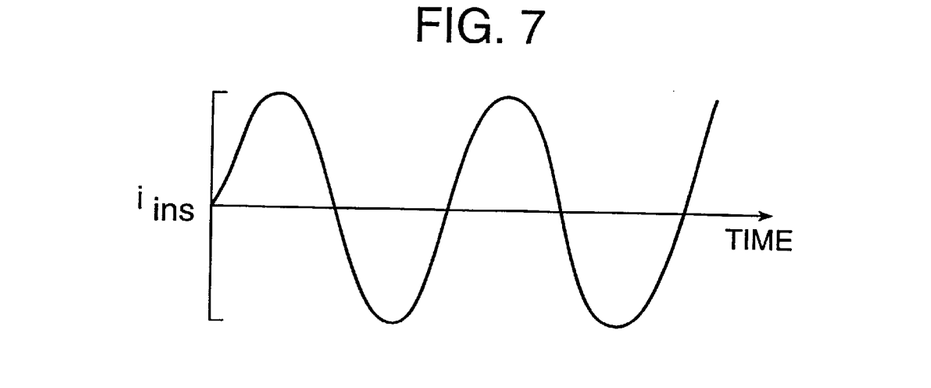
FIG. 7 is a plot of current for an insulating surface versus time for an oscillated electrode.

One solution to this problem has been proposed by Bard and Wipf, U.S. Pat. No. 5,382,336, which solution is illustrated in FIG. 4. In this scheme, the electrode 1 is oscillated up and down by an amount δ (16) so that the gap d (17) changes from d+δ to d−δ at the extreme of each oscillation as shown in the FIG. 5 plot of distance versus time. The corresponding oscillating component of the current ($i_{cond}$) a conducting surface versus time is shown in FIG. 6. A similar plot of the current ($i_{ins}$) for an insulating surface versus time is shown in FIG. 7. The signal for the case of an insulating surface is in phase with the applied modulation, and, consequently, the output of a lock-in detector fed with this signal would be a positive voltage proportional to the amplitude of the oscillating current. The signal for a conducting surface is out of phase with the modulation, and so the output of a lock-in detector fed with this signal would be a negative voltage proportional to the amplitude of the oscillating current signal. In this way, the output of the lock-in detector can be used to generate a feedback signal which has the correct sign in all cases. However, this scheme suffers from the limited resolution inherent in SECM probes with micrometer dimensions.

Figure 8:
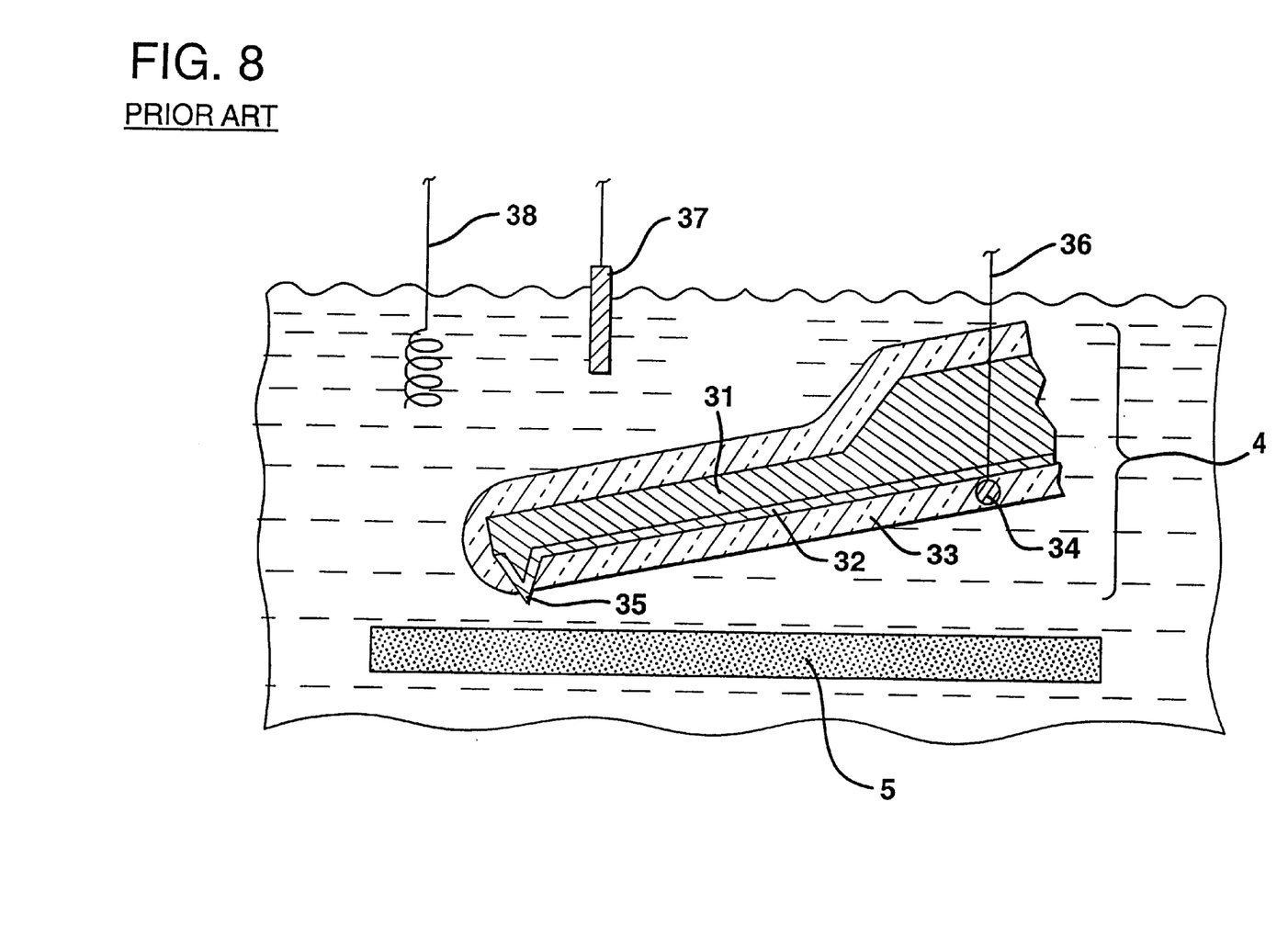
FIG. 8 is a schematic illustration of an insulated conducting probe AFM in accordance with the prior art.

Attaching the SECM electrode to the force sensing cantilever of an atomic force microscope (AFM) would improve resolution because the high topographical resolution of the AFM could be combined with the chemical sensitivity of the SECM. Macpherson et al, 118 *J. Am. Chem. Soc.* 6445–52 (1996) have attempted to do this by insulating a conducting AFM probe as illustrated in FIG. 8. An AFM probe 31 is coated on one side with a platinum film 32 contacted by a conducting clip 34. The clip is in turn connected to a conducting wire 36. The entire assembly is coated in a polystyrene film 33 to render it insulating. Operation of the cantilever in an AFM is assumed to have abraded away the insulating film in a small region near the tip 35, leaving an otherwise insulating film on the cantilever. The cantilever is inserted into an electrolyte 4 above a sample 5. Reference 37 and auxiliary electrodes 38 were also inserted into the electrolyte. In this case, the AFM was used for high resolution imaging, and the AFM cantilever coating was used as an electrode to generate a high concentration of the desired ions in the vicinity of the sample 5. SECM imaging was not attempted. This scheme has the drawback that the desired level of insulation is very hard to achieve. The currents through the cantilever are on the order of ten microamperes for an electrolyte concentration of 0.05 mole/liter. Using $D=1.3\times10^{-5}$ cm$^2$/sec and $I=10^{-5}$ A gives, from equation 1 above, a=0.08 cm, or d on the order of 1 mm. This is a very large exposed electrode area.

None of the existing SECM or AFM prior art techniques can detect the very small currents associated with electrochemical processes in single molecules. Such small currents have been detected by using a well insulated scanning tunneling microscope tip (Fan and Bard, 267 *Science* 871–74 (1995)) or by working in an insulating fluid (Han, Durantini et al, 101 *J. Phys. Chem.* 10719–725 (1997)) (where the quantitative advantage of potential control is lost). These experiments show that detection of electrochemical signals from single molecules requires a sensitivity in the picoampere (pA) range, six orders of magnitude smaller than the leakage signal from poorly insulated AFM tips.

Accordingly, there remains a need in the art for a technique and system to produce an SECM signal that is highly localized to a region close to an atomic force microscope tip. There also remains a need for a technique which is able to detect very small currents associated with electrochemical processes which avoids the problems of current leakage from AFM tips. Finally, there also remains a need for a technique and system which is able to acquire simultaneously AFM topographical images and SECM current data.

SUMMARY OF THE INVENTION

The present invention meets those needs by providing a scanning probe microscope for measuring at least one characteristic of a surface, the microscope including a force sensing probe which is responsive to the at least one characteristic of the surface, an oscillator which moves the position of the probe relative to the surface, a voltage source for establishing an electrical potential between the force sensing probe and the surface, and a detector which detects the oscillating component of the electrical current flow into or out of the probe as a measure of the at least one characteristic of the surface. In a preferred embodiment of the invention, The at least one characteristic of the surface is the electrochemical potential associated with the surface, such electrochemical potential resulting from molecules or ions on the substrate surface.

In a preferred form, the force sensing probe comprises an atomic force microscope cantilever including a tip. Preferably, the cantilever and the tip include at least one surface which has been coated with an electrically conductive material such as, for example, platinum. The cantilever is substantially completely covered with an electrically non-conductive material to render it non-conductive except for a portion of the tip. In a preferred form the non-conductive material comprises a polymer such as, for example, polystyrene.

The force sensing probe is oscillated in one of two preferred manners. In one embodiment, the oscillator comprises an acoustic transducer in communication with the probe. In another embodiment, the probe includes on a surface thereof a magnetic or magnetostrictive material, and the oscillator, preferably a solenoid, creates an oscillating magnetic field.

The detector the detector comprises a lockin circuit which provides a measure of the oscillatory component of the current. Preferably, the reference signal for the lockin is generated by the same signal used by the oscillator.

The present invention also provides a process for measuring the electrochemical properties of a surface of a substrate which includes the steps of providing an oscillated force sensing probe, establishing an electrical potential between the force sensing probe and the surface of the substrate in an aqueous electrolyte, the potential being insufficient to cause ions in the electrolyte to undergo oxidation or reduction, moving the oscillated force sensing probe across the surface, and measuring the oscillatory component of the electric current resulting from contact between the probe and electro-active species on the surface of the substrate. In a preferred embodiment of the invention, the electro-active species comprise molecules or ions. The process is particularly useful in the measurement of the electrochemical properties of proteins such as, for example, beta-carotene.

In yet another embodiment of the invention, a scanning probe microscope for the simultaneous acquisition of electrical and topographical information from a surface of a substrate is provided and includes a force sensing probe, an oscillator which moves the position of the probe relative to the surface, a voltage source for establishing an electrical potential between the force sensing probe and the surface, a first detector which detects the oscillating component of the electrical current flow into or out of the probe as a measure of the electrochemical potential associated with the surface, and a second detector which detects the deflection of the force sensing probe as a measure of the topology of the surface.

In operation, the microscope includes a conducting AFM probe (cantilever and tip) which is electrically insulated so as to expose only a small region in the vicinity of the tip. The probe is oscillated, for example, either by acoustic excitation or by applying a magnetic force to a magnetic coating on the cantilever. A lock-in is used to detect the oscillating component of current that arises from the oscillation of the tip with respect to a sample surface containing electrochemically active molecules. The electrolyte is chosen so as to provide a current path to the tip and substrate but with a formal potential far enough removed from the surface molecules that any additional electrochemical current on approaching the surface comes only from electrochemically active molecules on the surface under study. Because the leakage current is not oscillating, detection of the oscillating signal in a sufficiently narrow bandwidth (such as, for example, 500 Hz) permits extraction of signals from the surface which are orders of magnitude smaller than the leakage signal owing to bulk electrolyte. As the oscillating signal is confined to the region of the tip closest to the surface, high resolution electrochemical imaging is possible even if the insulation of the tip is exposed over a much larger area. Conventional AFM topographical scans may also be acquired at the same time.

Accordingly, it is a feature of the present invention to provide a SECM signal that is highly localized to a region close to an atomic force microscope tip. It is a further feature of the invention to reduce the noise from unwanted leakage currents not associated with the surface under study. It is a further feature of the invention to permit simultaneous acquisition of AFM topographical images and SECM current data. These and other features and advantages of the present invention will become apparent from the following detailed description, the accompanying drawings, and the appended claims.

DETAILED DESCRIPTION OF THE PREFERRED EMBODIMENTS

Figure 9:
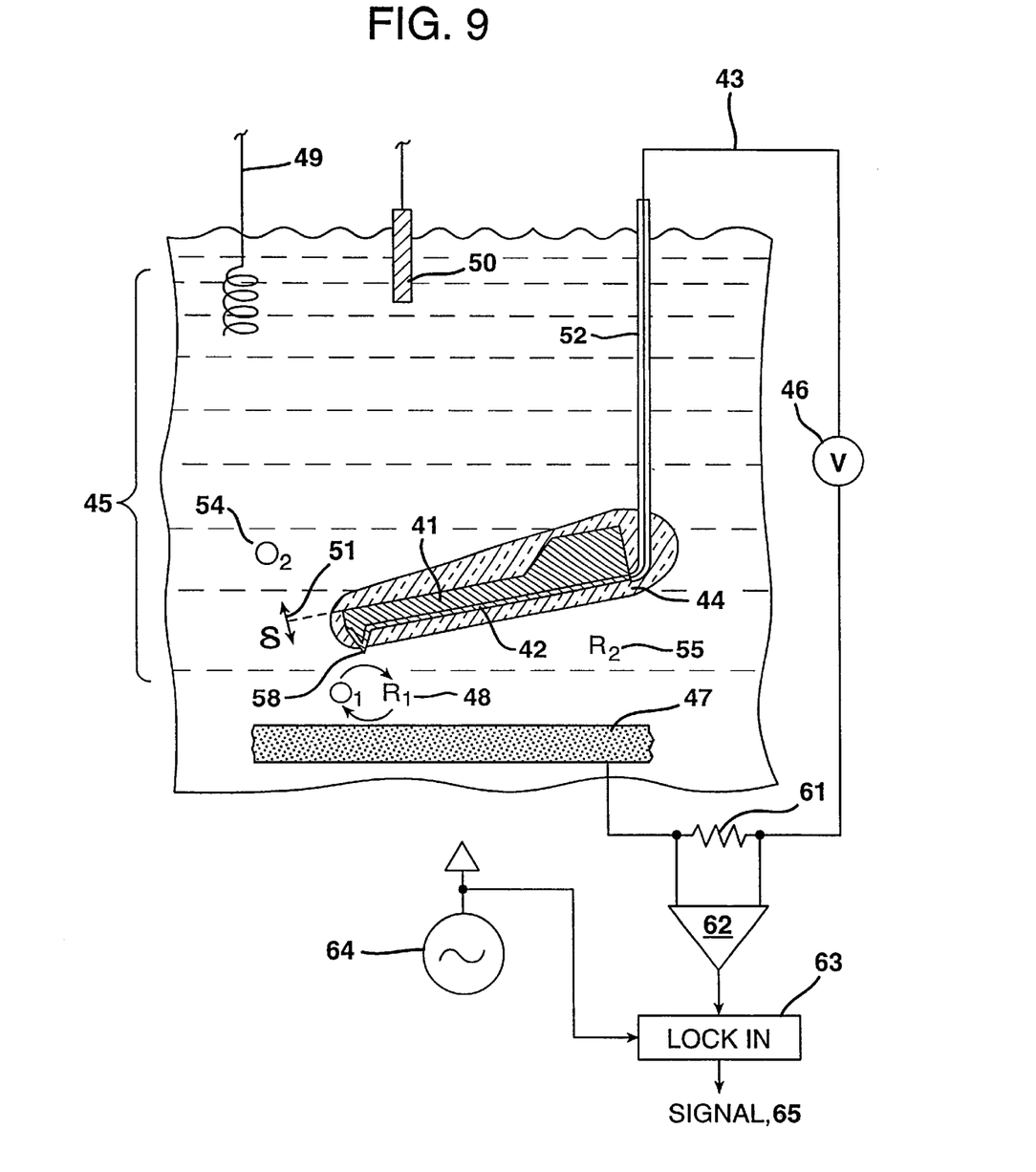
FIG. 9 is a schematic illustration of one embodiment of the scanning electrochemical microscope of the present invention.

The microscope of the present invention is shown in its preferred embodiment in FIG. 9. The microscope comprises an atomic force microscope (AFM) cantilever assembly 41 which has coated on one side thereof an electrically conductive material 42 such as a metal. In a preferred form, electrically conductive material 42 comprises platinum. A wire 43 is attached to this conducting layer and the cantilever assembly is made to be electrically insulative. This may be accomplished, for example, by encapsulation of the assembly in an electrically insulating film 44 such as, for example a polymeric material such as polystyrene. The connecting wire 43 is insulated with a dielectric sheath 52 so that no part of it is in contact with the electrolyte 45. Electrolyte 45 typically comprises an aqueous solution containing dissolved ions which can be chemically reduced or oxidized. The dissolved ions render the electrolyte electrically conductive.

In this preferred embodiment, the microscope is designed to detect and measure the electrochemical properties of molecules or ions on the surface of a sample. Thus, as shown in FIG. 9, sample 47 contains electrochemically active species 48 anchored to its surface. This species has different charge states designated as $O_1$ and $R_1$. These species 48, in the form of ions or molecular ions, may be chemically tethered to the conducting substrate 47 or packed within a molecular monolayer self-assembled on the sample surface. The species could be naturally assembled, as, for example, in the case of electroactive surface proteins embedded in a biological membrane which has been spread onto the electrode 47. The sample is covered by and immersed in a supporting electrolyte 45. The dissolved ions in this electrolyte $O_2$ (54) and $R_2$ (55) have the property that they are much less easily reduced and/or oxidized than the ions or molecules on the sample surface.

For example, the molecule on the surface (48, $O_1R_1$) could be beta-carotene, an organic molecule that is oxidized at the formal potential of +0.53V on the saturated calomel electrode (SCE) scale. The source of dissolved ions 54, 55 could be sodium perchlorate which produces the sodium ion, $Na^+$, and the perchlorate ion $HCLO_3^-$ in aqueous solution. These ions do not undergo bulk-solution oxidation or reduction in aqueous electrolyte. However, the electrolyte serves the purpose of rendering the solution electrically conductive, so that tip 58 and sample 47 may be maintained under electrochemical potential control by auxiliary electrode 50 with respect to the reference electrode 49. A small additional bias voltage V from source 46, may be applied between the conducting AFM tip 58 and the sample 47 as shown in FIG. 9.

The AFM tip is oscillated up and down by a small amount $\delta$, 51 by an oscillating voltage 64 at a frequency f. In preferred embodiments, such oscillation is accomplished by the use of either an acoustic signal or a magnetic signal as will be described in greater detail below.

Because the species of interest 48 is attached to the sample surface, then, in the absence of a mediator which is reduced and oxidized within the potential difference between tip and substrate, electrons from voltage source 46 can only be transferred into or out of the molecule in question by the tip 58 if it comes sufficiently close for direct electron transfer to occur. For direct electron transfer to occur requires that the tip 58 touch the species of interest 48. Thus, the current from the tip 58 will not vary in an oscillatory fashion unless the tip is directly over the species of interest 48, at which time a current on the order of picoamps to hundreds of picoamps will flow (see, Han, Durantini et al., *J. Phys. Chem.* 101:10719–10725 (1997)), depending upon the potential of the surface and the voltage applied between the tip and substrate 46.

This current is detected by resistor 61, amplified by amplifier 62, and fed to the lockin circuit 63. As is known in this art, the lockin circuit 63 has the capability of measuring the magnitude of a signal that is in phase with a reference oscillation, and the magnitude of the component that is out of phase with a reference component, averaged over a selected integration time. The lockin circuit reference oscillation signal is generated by the same signal used to oscillate the tip 64. The output signal 65 is proportional to the amplitude of the oscillating current from the oscillator.

With care, an exposed area of electrically conductive material of only a few microns by a few microns at the tip can be achieved by covering the tip with an insulating material and then scanning the tip over a hard electrically conductive surface and abrading away the insulating material until an electrical current is detected. Operation of the tip in a supporting electrolyte concentration of 0.01 M/liter gives rise to a leakage current of only a few nanoamperes (nA), as can be derived from equation 1 with $D=5\times10^{-6}$ cm$^2$/sec. The noise from this background signal in a bandwidth of B Hz is dominated by shot noise and is given by the equation:

$$I_{noise} = \sqrt{2qI_{laek}B} \qquad (2)$$

where $I_{noise}$ is the RMS value, $I_{laek}$ is the leakage current, and q is the charge on an electron. Taking B=500 Hz and $I_{laek}$=1 nA, a value is obtained for $I_{noise}$ of 0.4 pA. Thus, oscillating currents of sub-picoampere (pA) magnitude may be detected in the presence of DC leakage currents of nanoampere magnitude with an instrument bandwidth of 500 Hz. If each pixel of image information is acquired in 1 millisecond, this results in acquisition of a 256×256 pixel image in just over a minute.

In one mode of operation, a small bias voltage 46 (ca. 0.1V) is applied between the tip 58 and substrate 47, and side-by-side images are acquired from the normal AFM topographic signal and the current signal output 65 from the lockin circuit 63 and amplifier 62 as the potential of the substrate is varied. It has been shown that the electron transfer through the surface species is a maximum close to the formal potential for oxidation/reduction of the surface species 48. See, Tao, *Phys. Rev. Letters*, 76:4066–4069 (1996). Thus, the current image will show a maximum brightness when the surface potential is set near the formal potential of the species on the surface.

Figure 10:
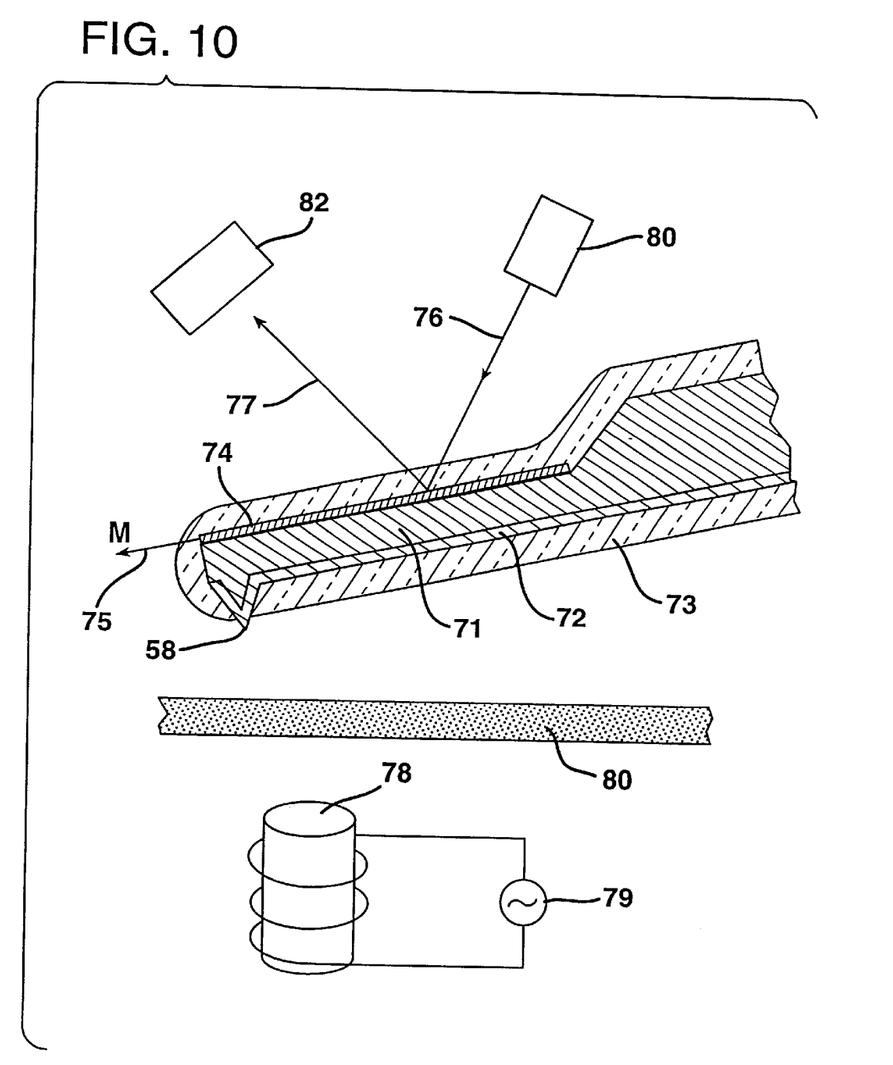
FIG. 10 is a schematic illustration of an embodiment of the invention for magnetic oscillation of the probe.

In a preferred embodiment, the tip 58 is oscillated by an oscillating magnetic field as disclosed in Lindsay, U.S. Pat. Nos. 5,513,518, and 5,612,491, and 5,753,814, and pending U.S. patent application Ser. No. 08/905,815, now U.S. Pat. No. 5,983,712, the disclosures of which are hereby incorporated by reference. This arrangement is shown in FIG. 10. There cantilever 71 is coated on one side thereof with an electrically conductive material such as, for example, platinum film 72. The cantilever is coated on its opposite surface with a magnetic or magnetostrictive film 74 such that the direction of magnetic moment M is along the soft axis 75 of the cantilever 71. The entire cantilever assembly is then made electrically insulating by encapsulating the assembly in an insulating film 73 of an electrically nonconductuve material such as polystyrene, except for a small area around the tip 58 which is removed by the abrasion that occurs when the tip is scanned across a hard surface as explained previously. The motion of the tip is detected in a manner conventional in this art using a laser source 80 to produce a laser beam 76, 77 which is reflected off of the surface of the cantilever 71 and detected by a detector 82. A solenoid 78 is placed in close proximity to the magnetic or magnetostrictive film 74 to generate motion by tip 58 when it is driven by an oscillating voltage 79.

Figure 11:
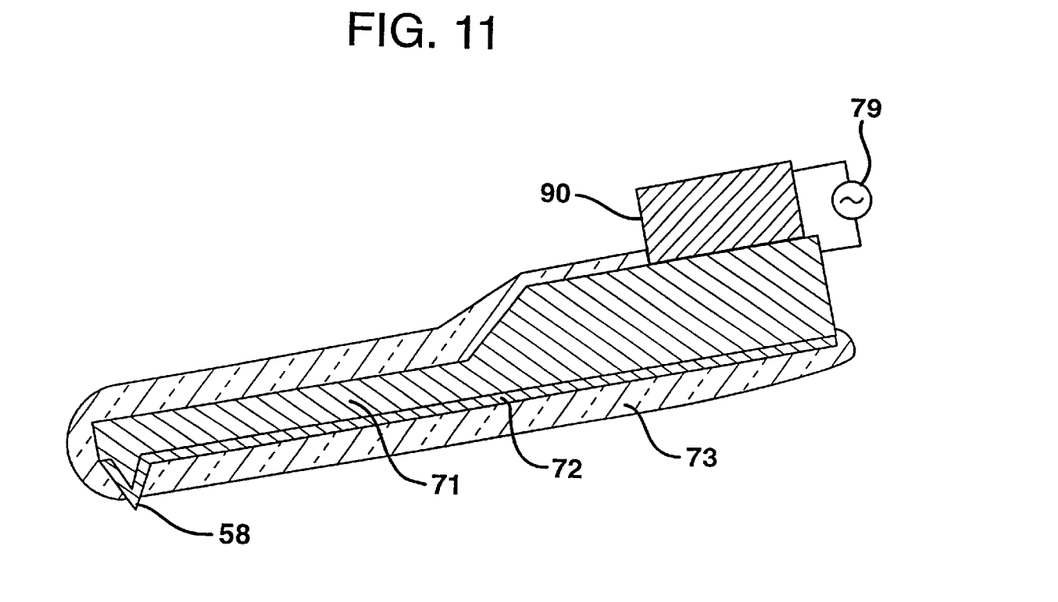
FIG. 11 is a schematic illustration of an embodiment of the invention for acoustic oscillation of the probe.

In another embodiment of the invention which is shown in FIG. 11, a cantilever 71 having a conductive coating 72 and an insulating encapsulating layer 73 is securely attached to a piezoelectric transducer 90 which is driven by an oscillating voltage 79. The corresponding mechanical excitation of tip 58 leads directly to motion of the end of the tip if a suitable resonance is driven.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A scanning probe microscope capable of simultaneously measuring topographical and electrochemical measurements of a surface, comprising:

a cantilever assembly having an electrically conductive material with a protruding tip, said cantilever assembly is substantially completely covered with an electrically non-conductive material except for a portion of said protruding tip;

an oscillator which moves the position of said cantilever assembly relative to said surface;

a detector which detects the position of said cantilever assembly relative to said surface as a measure of the topology of said surface;

a voltage source for establishing an electrical potential between said protruding tip and said surface;

an insulated electrical connection between said electrically conductive material and said voltage source; and, a lockin circuit which synchronously detects an oscillating component of electrical current flow into or out of said protruding tip as a measure of the electrochemical current of said surface when said electrical potential between said protruding tip and said surface and the position of said cantilever assembly relative to said surface permit electrical current flow.

2. A scanning probe microscope as claimed in 1 in which said electrically conductive material comprises platinum.

3. A scanning probe microscope as claimed in claim 1 in which said electrically non-conductive material comprises a polymer.

4. A scanning probe microscope as claimed in claim 3 in which said polymer comprises polystyrene.

5. A scanning probe microscope as claimed in claim 1 in which said oscillator comprises an acoustic transducer in communication with said cantilever assembly.

6. A scanning probe microscope as claimed in claim 1 in which said cantilever assembly further includes on a surface thereof a magnetic or magnetostrictive material, and said oscillator creates an oscillating magnetic field.

7. A scanning probe microscope as claimed in claim 6 in which said oscillator comprises a solenoid.

8. A scanning probe microscope as claimed in claim 1 in which said lockin circuit is connected to said voltage source and receives a signal generated by said oscillator to move said protruding tip.

9. A scanning probe microscope for the simultaneous acquisition of electrical and topographical information from a surface of a substrate comprising:

a force sensing probe having an electrically conductive material with a protruding tip, said force sensing probe is substantially completely covered with an electrically non-conductive material except for a portion of said protruding tip;

an oscillator which moves the position of said probe relative to said surface and provides a reference signal;

a voltage source for establishing an electrical potential between said force sensing probe and said surface;

a first detector which detects deflection of said force sensing probe as a measure of the topology of said surface; and a second detector which receives said reference signal and detects an oscillating component of electrical current flow into or out of said probe as a measure of the electrochemical potential associated with said surface when said electrical potential between said probe and said surface and the deflection of said probe permit electrical current flow.

* * * * *